Sept. 16, 1941.         P. W. KRIDLER         2,255,793
FISHHOOK
Filed Sept. 16, 1940

INVENTOR.
Philip W. Kridler
BY
ATTORNEY.

Patented Sept. 16, 1941

2,255,793

UNITED STATES PATENT OFFICE 2,255,793

FISHHOOK

Philip W. Kridler, Detroit, Mich.

Application September 16, 1940, Serial No. 356,957

6 Claims. (Cl. 43—28)

This invention relates to fish hooks and has for its primary object to provide a hook having means for quickly and easily connecting a leader or line thereto, in a manner such that it may be quickly and easily removed.

In order to change a fishing device such as a hook, fly or artificial lure many fishermen simply break or cut the leader adjacent the eye for the reason that it is very difficult, if not practically impossible, to untie a wet leader. Such a procedure naturally shortens the leader, and finally the leader is shortened to an extent that it becomes useless. The object of this invention, more specifically stated, is to avoid the necessity of cutting or untying the leader in order to quickly change a hook or similar device.

According to this invention the hook is provided with an eye through which the leader is threaded and a screwthreaded member for clamping the line against a shouldered portion on the shank of the hook. The screwthreaded member in some cases constitutes the body of a fly, with feathers or wigglers directly attached thereto. In this latter case the screwthreaded element not only serves as a line attaching means but also as a means enabling interchanging of flies on the same hook.

Figure 1:
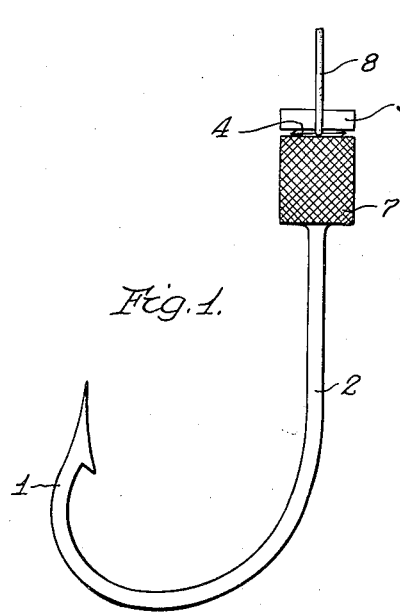
Figure 2:
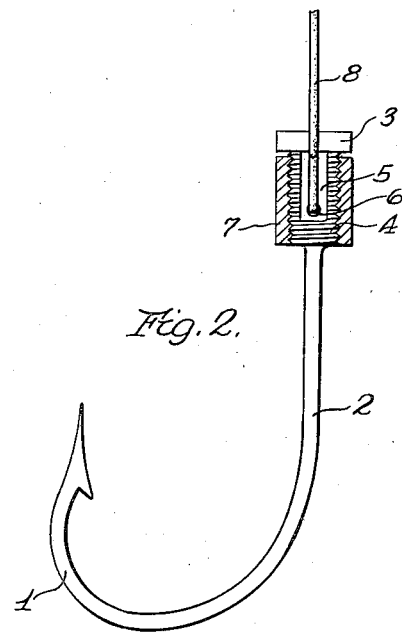
Figure 4:
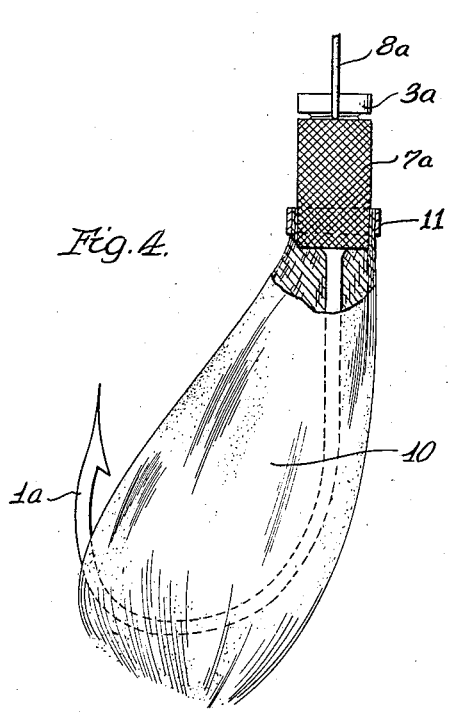
Figure 3:
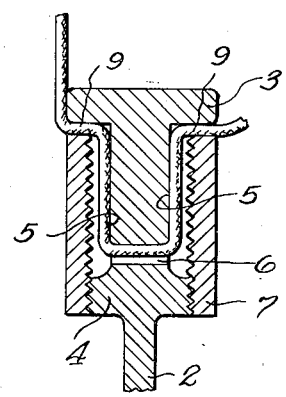

Other objects and advantages will become more fully apparent as reference is made to the accompanying drawing wherein my invention is illustrated, and in which Fig. 1 is an elevation of a hook attached to a leader, Fig. 2 is a view similar to Fig. 1 with the clamping element shown in cross section, Fig. 3 is an enlarged cross section illustrating the leader clamping means, and Fig. 4 is an elevation illustrating the attachment of feathers or wigglers to the clamping means.

More specifically, 1 designates a fish hook having a shank 2 formed with a head 3 on the end thereof and having an externally threaded portion 4 immediately adjacent the head. The threaded portion 4 has portions thereof removed to form two diametrically opposed facets 5, and an eye 6 extends therethrough and opens through the facets. An internally threaded sleeve 7 is received on the screwthreaded portion.

To attach the hook to a leader the sleeve 7 is unscrewed to an extent exposing the eye 6. The end of the leader 8 is then inserted through the eye and the sleeve is screwed back into place so that portions 9 of the leader become clamped between the end of the sleeve and the head 3. The facets 5 enable tightening of the sleeve into its clamping position without the threads of the sleeve cutting or shearing the leader.

In Fig. 4 there is shown a hook 1a having a sleeve 7a similar to the sleeve 7, mounted on the shank thereof and coacting with the head 3a in clamping the leader 8a. The sleeve 7a has feathers or wigglers 10 attached thereto. By attaching the feathers or wigglers to the sleeve to form a fly-type artificial lure, different types of flies may be used on the same hook simply by changing the sleeve. The feathers or wigglers 10 may be secured to the sleeve 7a in any suitable manner such, for example, a band or ring 11.

Although specific embodiments of the invention have been illustrated and described, it will be understood that various changes may be made within the scope of the appended claims without departing from the spirit of the invention, and such changes are contemplated.

What is claimed is:

1. A fish hook having a shank with a head on its end and a screwthreaded portion adjacent the head, said shank having means for the reception of a leader, and an internally threaded member on said screwthreaded portion adapted to engage a leader inserted in said means and to clamp portions thereof against the head to prevent removal of the leader from said means.

2. A fish hook having a shank with a head on its end and a screwthreaded portion adjacent the head, said screwthreaded portion having an eye for the reception of a leader, and an internally threaded member on said threaded portion adapted to engage a leader inserted through said eye for clamping the leader against the head.

3. A fish hook having a shank with a head on its end and a screwthreaded portion adjacent the head, said screwthreaded portion having an eye for the reception of a leader, an internally threaded member on said threaded portion adapted to engage a leader inserted through said eye for clamping the leader against the head, said eye being spaced from said head, and said threaded portion being removed adjacent the eye to provide space between the threaded portion and the internally threaded member to accommodate the leader.

4. A fish hook having a shank with a head on its end and a screwthreaded portion adjacent the head, said shank having means for the reception of a leader, an internally threaded member on said screwthreaded portion adapted to engage a leader inserted in said means and to clamp portions thereof against the head to prevent removal of the leader from said means, and artificial lure means on said internally threaded member and removably secured to the hook thereby.

5. A fish hook having a shank with a head on its end and a screwthreaded portion adjacent the head, said screwthreaded portion having an eye for the reception of a leader, an internally threaded member on said threaded portion adapted to engage a leader inserted through said eye for clamping the leader against the head, and artificial lure means on said internally threaded member and removably secured to the hook thereby.

6. A fish hook having a shank with a head on its end and a screwthreaded portion adjacent the head, said screwthreaded portion having an eye for the reception of a leader, an internally threaded member on said threaded portion adapted to engage a leader inserted through said eye for clamping the leader against the head, said eye being spaced from said head, and said threaded portion being relieved adjacent the eye to provide space between the threaded portion and the internally threaded member to accommodate the leader, and artificial lure means on said internally threaded member and removably secured to the hook thereby.

PHILIP W. KRIDLER.